United States Patent [19]

Tanaka et al.

[11] Patent Number: 4,620,097
[45] Date of Patent: Oct. 28, 1986

[54] METHOD OF ADJUSTING SCALE FACTOR FOR RADIATION IMAGE

[75] Inventors: Hiroshi Tanaka; Yuuma Adachi; Nobuyoshi Nakajima, all of Kanagawa, Japan

[73] Assignee: Fuji Photo Film Co., Ltd., Kanagawa, Japan

[21] Appl. No.: 673,238

[22] Filed: Nov. 19, 1984

[51] Int. Cl.$^4$ .............................................. G03C 5/16
[52] U.S. Cl. ............................ 250/327.2; 250/484.1
[58] Field of Search ........................ 250/484.1, 327.2; 364/414

[56] References Cited

U.S. PATENT DOCUMENTS 4,527,060 7/1985 Suzuki et al. ..................... 250/327.2

Primary Examiner—Carolyn E. Fields
Attorney, Agent, or Firm—Sughrue, Mion, Zinn, Macpeak & Seas

[57] ABSTRACT

In a radiation image recording and reproducing system, final read-out of a radiation image stored in a stimulable phosphor sheet is conducted by exposing the stimulable phosphor sheet to stimulating rays, and photoelectrically detecting light emitted by the stimulable phosphor sheet upon stimulation thereof to obtain a visible image. Prior to the final read-out, preliminary read-out is conducted for detecting the image input information by use of stimulating rays having stimulation energy lower than the stimulation energy of stimulating rays used in the final read-out. By the preliminary read-out, the minimum stimulated emission intensity among all points over the whole surface of the stimulable phosphor sheet and that among all points in one region within the radiation exposure field of the stimulable phosphor sheet at the time of the image recording are measured. A scale factor in the final read-out is adjusted in accordance with the difference between the minimum stimulated emission intensities thus measured.

6 Claims, 4 Drawing Figures

METHOD OF ADJUSTING SCALE FACTOR FOR RADIATION IMAGE

BACKGROUND OF THE INVENTION

1. Field of the Invention

This invention relates to a method of adjusting a scale factor when a radiation image stored in a stimulable phosphor sheet is read out. This invention particularly relates to a method of adjusting the latitude in final read-out by detecting in advance the image input level of a radiation image by preliminary read-out conducted prior to the final read-out from a stimulable phosphor sheet carrying the radiation image stored therein.

2. Description of the Prior Art

When certain kinds of phosphors are exposed to a radiation such as X-rays, α-rays, β-rays, γ-rays, cathode rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the stimulable phosphor varies over a very wide range in proportion to the amount of energy stored therein, it is possible to obtain an image having desirable density regardless of the amount of exposure of the stimulable phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image recording and reproducing system using a stimulable phosphor sheet, compensation for deviation of the level of the radiation energy stored in the stimulable phosphor sheet from a desired level can easily be carried out by adjusting the read-out gain to an appropriate value when photoelectrically reading out the light emitted from the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted from the stimulable phosphor sheet into an electric signal, and processing the electric signal as desired. Particularly, when the radiation image is used for medical diagnosis, it is possible to obtain a radiation image processed in the manner most suitable for a particular portion of the human body such as the heart, the chest or the like, thereby realizing an improvement in diagnostic efficiency and accuracy.

However, in order to eliminate various influences caused by the fluctuation of radiographic exposure conditions and/or to obtain a radiation image having a high image quality or a high diagnostic efficiency and accuracy, it is necessary to investigate such image input conditions of the radiation image stored in the stimulable phosphor sheet as, for example, the level of radiation dose used for image recording, or the image input pattern which is determined by the portion of the body (e.g. the chest or the abdomen) or the radiographic method used, such as plain image or contrasted image radiographing, before reproducing the radiation image to a visible image, and then to appropriately adjust the read-out conditions such as read-out gain or scale factor. Then, the image signal read out based on the adjusted read-out conditions, is appropriately processed. The image input conditions and the image input pattern will hereinafter be simply referred to as the image input information when they are referred to generically.

Investigation of the image input information may be conducted prior to the visible image reproduction by use of the method as disclosed in Japanese Unexamined Patent Publication No. 58(1983)-67240. In the method, a read-out operation for detecting the image input information of a radiation image stored in a stimulable phosphor sheet (hereinafter referred to as the preliminary read-out) is conducted in advance by use of stimulating rays having stimulation energy of a level lower than the level of the stimulation energy of stimulating rays used in a subsequent read-out operation for obtaining a visible image for viewing, particularly for diagnostic purposes (hereinafter referred to as the final read-out), and thereafter the final read-out is carried out. In the final read-out, the read-out conditions such as the read-out gain and/or the scale factor are appropriately adjusted on the basis of the image input information obtained by the preliminary read-out. In this method, since the image input conditions and the image input pattern of a radiation image stored in the stimulable phosphor sheet can be investigated in advance, it is possible to obtain a radiation image having an improved image quality, particularly a high diagnostic efficiency and accuracy by adjusting the read-out gain and/or the scale factor based on the detected image input information in the manner most suitable for the image input pattern without using a read-out system having a wide dynamic range. Then, when required, the image signal is further processed to obtain an image of higher quality.

When the aforesaid method is applied, levels of signals detected by the preliminary read-out over the whole surface of the stimulable phosphor sheet are stored in a memory, and a histogram is created by calculating the stored signal levels by use of a signal processing apparatus. From the histogram, the maximum stimulated emission intensity (Smax) and the minimum stimulated emission intensity (Smin) necessary for viewing, particularly for diagnostic purposes are determined. Then, the scale factor (i.e. latitude) in the final read-out is determined on the basis of Smax and Smin.

In the case where the radiation image recording and reproducing system is used for medical diagnosis, portions of the human body not related to diagnosis should not be exposed to radiation since the radiation is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in many cases, the radiation exposure field should be limited when a radiation image is recorded. Normally, when the radiation exposure field is limited, radiation scattered by the object within the radiation exposure field passes outside of the radiation exposure field. The scattered radiation is absorbed and stored in the stimulable phosphor sheet, which exhibits high sensitivity. However, when the scale factor is determined by the aforesaid conventional method, it is not always possible to discriminate between the energy of the scattered radiation and the radiation energy of the image portion within the radiation exposure field, and the minimum stimulated emission intensity caused by the scattered radiation is detected as Smin. Normally, the minimum stimulated emission intensity of the scattered radiation is very much smaller than that at the image portion within the radiation exposure field. Therefore, when the minimum stimulated emission intensity caused by the scattered radiation is detected as Smin, since the signal caused by the scattered radiation not related to diagnosis is taken within a low density range in the final read-out, the density of the image of the portion related to diagnosis becomes too high. As a result, the image contrast decreases and it becomes difficult to make an accurate diagnosis.

SUMMARY OF THE INVENTION

The primary object of the present invention is to provide a method of adjusting the scale factor for a radiation image, which is not affected by scattered radiation passing outside of the object when the radiation exposure field is limited.

Another object of the present invention is to provide a method of adjusting the scale factor for a radiation image, which reduces the adverse effect of radiation on the object.

The specific object of the present invention is to provide a method of adjusting the scale factor for a radiation image, which realizes a visible radiation image having an improved image quality, particularly a high diagnostic efficiency and accuracy.

The method of adjusting the scale factor for a radiation image in accordance with the present invention is characterized by measuring, in preliminary read-out, the minimum stimulated emission intensity (Smin A) in the whole surface of a stimulable phosphor sheet and the minimum stimulated emission intensity (Smin B) in one region within a radiation exposure field used when the radiation image is stored in the stimulable phosphor sheet, and adjusting the scale factor in final read-out in accordance with the difference (Smin B−Smin A).

In the present invention, even when the radiation exposure field is limited at the time of storing a radiation image of an object in a stimulable phosphor sheet, it is possible to read out the radiation image with no adverse effect from radiation scattered outside of the object. Therefore, it becomes possible to obtain a visible image having contrast and density suitable for viewing, particularly for diagnostic purposes.

Accordingly, it becomes possible to limit the radiation exposure field at the image recording step without adversely affecting the image quality, particularly the diagnostic efficiency and accuracy. Further, since object portions which need not be viewed, particularly for diagnostic purposes, need not be exposed to radiation, it is possible to reduce adverse effects of the radiation on the object such as the human body. Also, it becomes possible to obtain a visible radiation image free from adverse effects of scattered radiation and exhibiting an improved image quality, particularly a high diagnostic efficiency and accuracy.

DESCRIPTION OF THE PREFERRED EMBODIMENTS

The present invention will hereinbelow be described in further detail with reference to the accompanying drawings.

Figure 1:
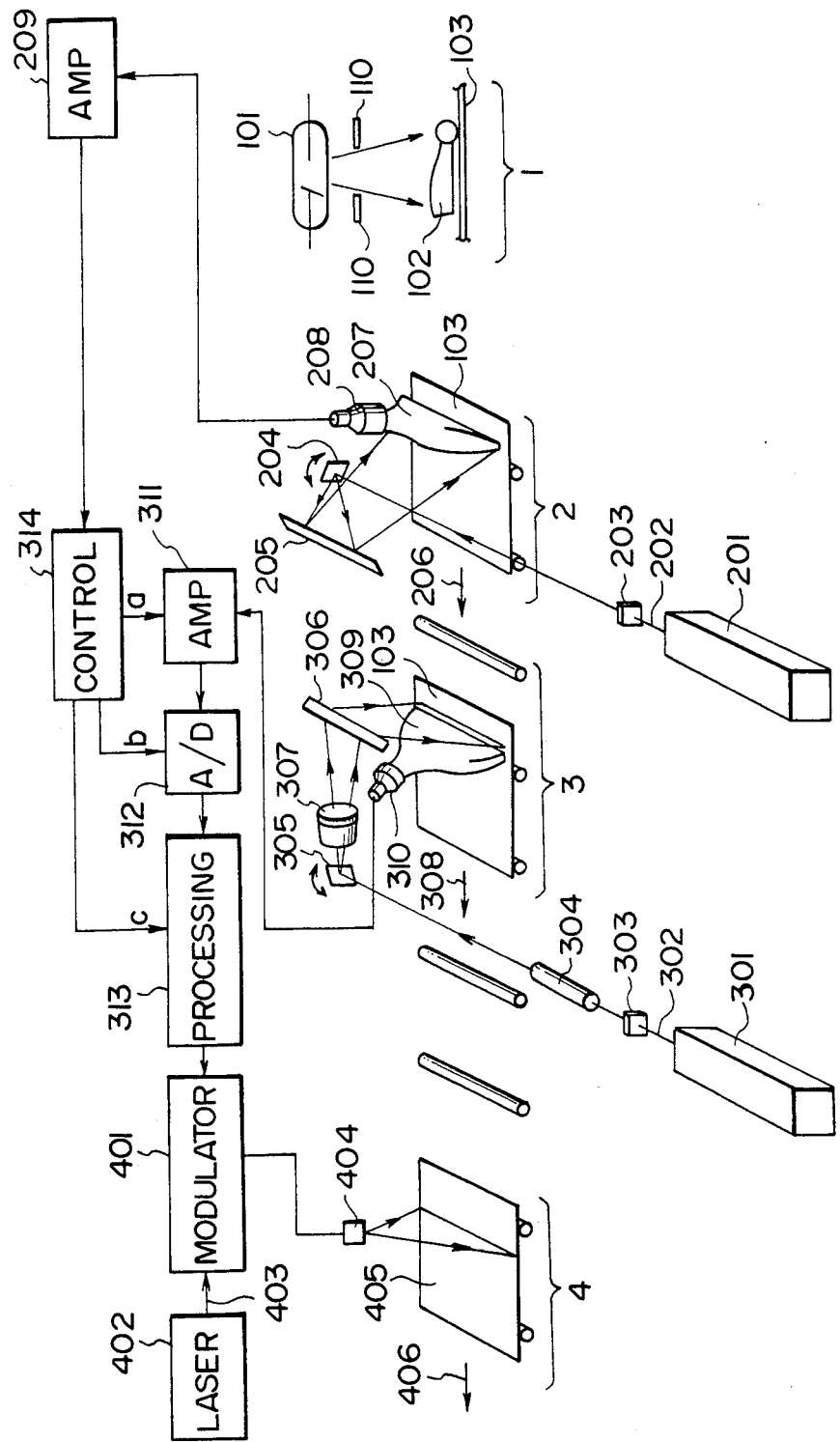
FIG. 1 is a schematic view showing the X-ray image recording and reproducing system wherein an embodiment of the method of adjusting the scale factor for a radiation image in accordance with the present invention is applied.

FIG. 1 schematically shows the X-ray image recording and reproducing system in which an embodiment of the method of adjusting the scale factor for a radiation image in accordance with the present invention is applied, and which comprises a recording section 1, a preliminary read-out section 2, a final read-out section 3, and an image reproducing section 4.

In the recording section 1, the exposure field of X-rays emitted by an X-ray source 101 to an object 102 is limited by a beam limiting device 110. The X-rays then pass through the object 102 and are absorbed by a stimulable phosphor sheet 103 to have an X-ray image of the object 102 stored therein. The stimulable phosphor sheet 103 carrying the X-ray image stored therein is sent to the preliminary read-out section 2.

In the X-ray image recording and reproducing system, in order to improve the signal-to-noise ratio, it is preferable that the stimulable phosphor emits light having a wavelength range not overlapping the range of wavelength of the stimulating rays employed to excite the stimulable phosphor. Preferably, when a stimulating ray source which emits stimulating rays having a wavelength within the range between 600 nm and 700 nm is used, a stimulable phosphor which emits light having a wavelength within the range between 300 nm and 500 nm should be selected, as disclosed in U.S. Pat. No. 4,258,264.

As the stimulable phosphor, for example, rare earth activated alkaline earth metal fluorohalide phosphor is preferred. One example of this phosphor is, as shown in DE-OS No. 2,928,245, a phosphor represented by the formula $(Ba_{1-x-y}, Mg_x, Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x}, M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; $BaQ.xAl_2O_3$:Eu wherein $0.8 \leq x \leq 10$; and $M^{II}O.xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light.

Further, barium fluorohalide phosphors added with a metal fluoride as disclosed in European Patent Publication No. 21,342, or barium fluorohalide phosphors added with at least one of a metal chloride, a metal bromide and a metal iodide as disclosed in European Patent Publication No. 29,063 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in European Patent Publication No. 21,174.

In the X-ray image recording and reproducing system wherein the method of adjusting the scale factor for a radiation image in accordance with the present invention is applied, the stimulation energy of the stimulating rays applied to the stimulable phosphor sheet in the preliminary read-out should be lower than the stimulation energy of the stimulating rays used in the final read-out. The "stimulation energy" referred to in this invention means the effective energy of the stimulating rays which the stimulable phosphor sheet receives per unit area. As the ratio of the stimulation energy of the stimulating rays in the preliminary read-out to the stimulation energy of the stimulating rays in the final read-out approaches one, the amount of radiation energy remaining in the stimulable phosphor sheet after the preliminary read-out decreases. It has been found that, when the aforesaid ratio is smaller than one, it is possible to obtain a radiation image suitable for viewing, particularly for diagnostic purposes, by adjusting the read-out gain to an appropriate value. However, in order to obtain a radiation image having an improved image quality, particularly a high diagnostic efficiency and accuracy, the aforesaid ratio should preferably be as small as possible insofar as the image input information of the radiation image stored in the stimulable phosphor sheet can be detected sufficiently to permit adjustment of the read-out gain or the signal processing conditions, that is, insofar as the light emitted by the stimulable phosphor sheet in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the accuracy of the system for detecting the light emitted by the stimulable phosphor sheet in the preliminary read-out.

In order to make the stimulation energy of the stimulating rays in the preliminary read-out smaller than the stimulation energy of the stimulating rays in the final readout, it is possible to use any known method. For example, the output level of the laser beam source used in the preliminary read-out may be decreased, the beam diameter of the laser beam may be increased, the scanning speed of the laser beam may be increased, or the moving speed of the stimulable phosphor sheet may be increased.

The preliminary read-out should preferably be conducted within one hour before the final read-out is started. Since the radiation energy stored in the stimulable phosphor sheet decays with time, the time interval between the preliminary read-out and the final read-out should be minimized in order to effectively use the image input information obtained in the preliminary read-out for the final read-out. It was found that the radiation energy stored in the stimulable phosphor sheet decays to the largest extent immediately after a radiation image is stored in the stimulable phosphor sheet. Thus approximately 10% of the radiation energy originally stored in the stimulable phosphor sheet is lost within approximately one hour after the radiation image is stored. Thereafter, the rate of decay becomes low. On the other hand, it was found that, when the difference between the amount of the radiation energy stored at the time of preliminary read-out and that at the time of final read-out is 10% or less, it is possible to obtain a radiation image having a practically sufficient image quality, particularly a sufficient diagnostic efficiency and accuracy, by detecting the image input information or the radiation image stored in the stimulable phosphor sheet and adjusting the final read-out conditions and/or the signal processing conditions by use of the detected image input information. Accordingly, when the time interval between the preliminary read-out and the final read-out is one hour or shorter, the difference between the amount of the radiation energy stored at the time of preliminary read-out and that at the time of final read-out always becomes 10% or less, and it is possible to obtain a visible radiation image having a practically sufficient image quality, particularly a sufficient diagnostic efficiency and accuracy.

In the preliminary read-out section 2, a laser beam 202 emitted by a laser beam source 201 is first passed throuth a filter 203 for cutting off the light beam having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) and, consequently, the whole surface of the stimulable phosphor sheet 103 is exposed to and scanned by the laser beam 202. The power, beam diameter, and scanning speed of the laser beam 202, and the moving speed of the stimulable phosphor sheet 103 are selected so that the stimulation energy of the laser beam 202 for preliminary read-out is smaller than the stimulation energy of the laser beam for final read-out. When exposed to the laser beam 202, the stimulable phosphor sheet 103 emits light in proportion to the X-ray energy stored therein, and the emitted light enters a light guide member 207. The light guide member 207 has a linear light input face positioned close to the scanning line on the stimulable phosphor sheet 103, and a ring-shaped light output face in close contact with the light receiving face of a photodetector 208, which may be a photomultiplier. The light guide member 207 is fabricated of a transparent thermoplastic resin sheet such as an acrylic resin sheet so that the light entering from the light input face can be effectively transmitted to the light output face by total reflection through the interior of the light guide member 207. The light emitted by the stimulable phosphor sheet 103 upon stimulation thereof is guided inside of the light guide member 207, emitted from the light output face of the light guide member 207 and received by the photodetector 208. The light guide member 207 may be of a shape and a material as disclosed in U.S. Pat. No. 4,346,296.

The light receiving face of the photodetector 208 is provided with a filter for transmitting only the light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light thus detected is converted into an electric signal, which is then amplified by an amplifier 209 and sent to a control circuit 314 of the final read-out section 3.

On the basis of the image input information thus obtained, the control circuit 314 calculates an amplification degree setting value (a), a scale factor setting value (b) and an image processing condition setting value (c).

The method of adjusting the scale factor setting value (b) in accordance with the present invention will hereinbelow be described in detail with reference to FIGS. 2, 3 and 4.

Figure 2:
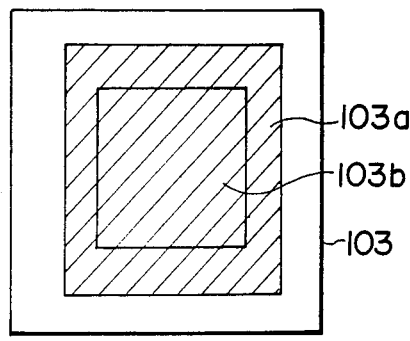
FIG. 2 is a plan view showing an X-ray exposure field (103a) and a region (103b) inside of the X-ray exposure field in a stimulable phosphor sheet.

FIG. 2 is a plan view showing the stimulable phosphor sheet 103 carrying an X-ray image stored therein. An X-ray exposure field 103a (hatched portion in FIG. 2) is limited within the stimulable phosphor sheet 103 when the X-ray image is stored therein. When the scale factor is adjusted, one region within the X-ray exposure field 103a is taken as a region 103b (hereinafter referred to as the region B), and the minimum amount of light emitted by any point of the region B upon stimulation thereof is compared with the minimum amount of light emitted by any point of the whole surface (hereinafter referred to as the region A) of the stimulable phosphor sheet 103. The area of the region B should preferably be within the range of approximately 20% to approximately 80% of the area of the region A.

Figure 3:
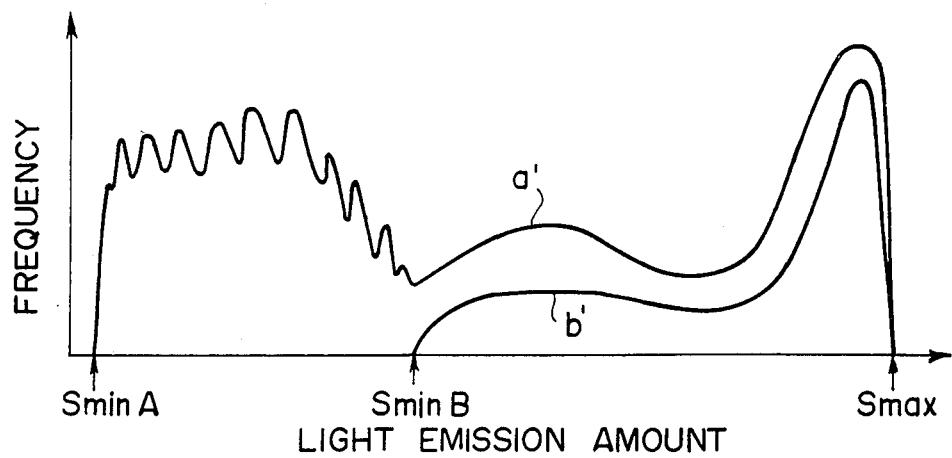
FIG. 3 is a graph showing the histograms of the amounts of light emitted by the stimulable phosphor sheet upon stimulation thereof, which are used in an embodiment of the method of adjusting the scale factor for a radiation image in accordance with the present invention.
Figure 4:
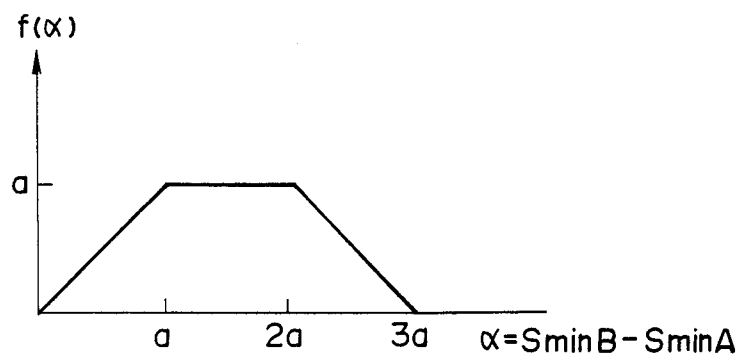
FIG. 4 is a graph showing the function used for calculating Smin in the embodiment of the method of adjusting the scale factor for a radiation image in accordance with the present invention.

FIG. 3 is a graph showing histograms of the amounts of light emitted by the regions A and B at the preliminary read-out step. In the graph, the curve a' indicates the histogram at the region A, and the curve b' indicates the histogram at the region B. Smin A and Smin B designate the minimum stimulated emission intensities in the histograms at the regions A and B, and Smax designates the maximum stimulated emission intensities in the histograms (which coincide with each other). In the histogram at the region A, light emission of low levels as indicated by a sawtoothed curve is recorded outside of the exposure region. The light emission of low levels is caused by scattered radiation stored in the stimulable phosphor sheet 103. Since the light emission of low levels is recorded in the histogram at the region A, Smin A in the histogram at the region A is smaller than Smin B in the histogram at the region B. In the conventional method wherein the scale factor in the final read-out is adjusted on the basis of the maximum stimulated emission intensity (Smax) and the minimum stimulated emission intensity (Smin) among all points over the whole surface of the stimulable phosphor sheet, Smin A is recorded as Smin. Therefore, in the conventional method, an image of high quality cannot be obtained by the final read-out. In the method of adjusting the scale factor in accordance with the present invention, Smin is calculated from (Smin B−Smin A) as described below.

By way of example, Smin is calculated by

Smin=Smin B−f(α)

where α=Smin B−Smin A. FIG. 4 shows an example of the function f(α). In this embodiment, f(α)=Smin B−Smin A when Smin B−Smin A≦a, f(α)=a when a<Smin B−Smin A≦2a, f(α)=Smin A−Smin B+3a when 2a <Smin B−Smin A≦3a, and f(α)=0 when 3a<Smin B−Smin A. Therefore, Smin is Smin=Smin A when Smin B−Smin A≦a, Smin=Smin B−a when a<Smin B−Smin A≦2a, Smin=2Smin B−Smin A−3a when 2a<Smin B Smin A≦3a, and Smin=Smin B when 3a<Smin B−Smin A.

That is, Smin is adjusted to be Smin=Smin A when (Smin B−Smin A) is not larger than a, and Smin=Smin B when (Smin B−Smin A) is larger than 3a. Smin is gradually changed when (Smin B−Smin A) is larger than a and up to 3a.

For example, in the case where an X-ray image of the leg is recorded and portions such as the knee and the ankle less permeable to X-rays are present outside of the region B, image information of such portions of a level lower than Smin B but higher than Smin A is recorded in the histogram of the region A. In such a case, if discontinuous points are generated like Smin=Smin A when Smin B−Smin A≦2a and Smin=Smin B when Smin B−Smin A>2a, a final read-out scale factor which makes it possible to accurately diagnose the images of the portions such as the knee and the ankle is not obtained. Accordingly, it is necessary to gradually change Smin within some range of (Smin B−Smin A).

By way of example, the number of bits for quantization when the amount of light emitted by a stimulable phosphor sheet at the preliminary read-out step is A/D converted to form a histogram is adjusted to 8 bits, and the value a is adjusted to be a=10QL where QL denotes the quantum level. In this case, the values of (Smin B−Smin A) at portions of the human body when the X-ray exposure field is not limited are as described below.

Chest (frontal): 0 to a
Chest (lateral/tomographic): a to 2a
Head (frontal/lateral): 0 to a
Neck (frontal/lateral): 1.5a to 3a
Limb 0 to :0 to 2.5a When the X-ray exposure field is limited, the values of (Smin B−Smin A) are 1.5a or higher, depending on the extent of limitation, and most values are 3a or higher. In the case where Smin B−Smin A=1.5a to 3a when the X-ray exposure field is limited, it may occur that the values of (Smin B Smin−A) overlap the values of (Smin B−Smin A) when the X-ray exposure field is not limited. It is considered that, in such a case, an image of a portion comparatively less permeable to X-rays is recorded outside of the region B. Accordingly, when the value of (Smin B−Smin A) is within such a range, it is necessary to gradually change Smin. For this reason, the aforesaid function should preferably be used.

After Smin is determined as described above, the scale factor is adjusted on the basis of Smin and Smax.

Reverting to FIG. 1, the stimulable phosphor sheet 103 for which the preliminary read-out is finished is sent to the final read-out section 3. In the final read-out section 3, a laser beam 302 emitted by a laser beam source 301 is first passed through a filter 303 for cutting off the light beam having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is positioned an fθ lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. sub-scanning direction) and, consequently, the whole area of the stimulable phosphor sheet 103 is exposed to and scanned by the laser beam 302. Upon exposure to the laser beam 302, the stimulable phosphor sheet 103 emits light in proportion to the X-ray energy stored therein, and the light emitted enters a light guide member 309 which is made of the same material and has the same configuration as those of the light guide member 207 used for the preliminary read-out. The light emitted by the stimulable phosphor sheet 103 is guided inside of the light guide member 309 through total reflection, emitted from the light output face of the light guide member 309 and received by a photodetector 310. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The light emitted by the stimulable phosphor sheet 103 and detected by the photodetector 310 in the final readout is converted into an electric signal, amplified to an appropriate level by an amplifier 311 the sensitivity of which has been adjusted by the amplification degree setting value (a), and then sent to an A/D converter 312. In the A/D converter 312, the electric signal is converted into a digital signal by use of a scale factor which has been set by the scale factor setting value (b) adjusted by the method of the present invention to suit the width of signal fluctuation. The digital signal thus obtained is sent to a signal processing circuit 313, in which it is processed on the basis of the image processing condition setting value (c) so as to obtain a radiation image suitable for viewing, particularly for diagnostic purposes. The electric image signal obtained by the signal processing circuit 313 is sent to a light modulator 401 at the image reproducing section 4. As for the signal processing, it is possible to employ a frequency processing as disclosed in U.S. Pat. Nos. 4,315,318, 4,346,295 or 4,387,428, or European Patent Publication No. 31,952, and a gradation processing as disclosed in U.S. Pat. Nos. 4,302,672, 4,276,473 or 4,310,886.

In the image reproducing section 4, a laser beam 403 emitted by a reproducing laser beam source 402 is modulated by the light modulator 401 on the basis of the electric image signal, and is made to impinge upon a photosensitive material 405 such as a photographic film by a scanning mirror 404 for scanning the photosensitive material 405 by the laser beam 403. At this time, the photosensitive material 405 is moved normal to the scanning direction, i.e. in the direction as indicated by the arrow 406. Accordingly, the radiation image is recorded in the photosensitive material 405. For reproducing the radiation image, it is also possible to use any other method. For example, the final signal obtained at the final read-out section 3 may be electronically displayed on a display device such as a CRT, or the final radiation image may be recorded by use of a video tape recorder or a printer. Alternatively, the radiation image may be reproduced on a thermosensitive recording material by use of heat waves.

Of course, the method of adjusting the scale factor for a radiation image in accordance with the present invention is not limited to the use in the X-ray image recording and reproducing system as described above but can be applied to modified forms of the aforesaid system.

For example, the method of the present invention can also be applied to a system provided with a single readout apparatus which is used for the preliminary read-out and the final read-out.

It is also possible to replace the laser beam sources 201 and 301 for emitting the stimulating rays by LED arrays having a wavelength range different from that of the light emitted by the stimulable phosphor sheet upon stimulation thereof. In this case, the light deflectors 204 and 305 may be omitted.

Further, instead of the photodetectors 208 and 310 provided with the light guide members 207 and 309, respectively, it is also possible to use a linear sensor comprising a plurality of photomultipliers or phototransistors positioned along a straight line in the main scanning direction.

Also, the function used for calculating Smin is not limited to the one as described above. It may, of course, be changed in accordance with the image recording portion of an object, the image recording conditions, the configuration of the read-out apparatus, or the like.

We claim:

1. A method of adjusting a scale factor for a radiation image wherein the scale factor in final read-out for exposing a stimulable phosphor sheet carrying the radiation image stored therein to stimulating rays which cause the stimulable phosphor sheet to emit light in proportion to the stored radiation energy, and photoelectrically detecting the emitted light to obtain a visible image is adjusted by, prior to the final read-out, conducting preliminary read-out for detecting the radiation image stored in the stimulable phosphor sheet by use of stimulating rays having stimulation energy lower than stimulation energy of stimulating rays used in the final read-out, the method of adjusting a scale factor for a radiation image comprising the steps of:

(i) by the preliminary read-out, measuring the minimum stimulated emission intensity among all points over the whole surface of said stimulable phosphor sheet and the minimum stimulated emission intensity among all points in one region within a radiation exposure field of said stimulable phosphor sheet at the time of the radiation image recording, and (ii) adjusting the scale factor in the final read-out in accordance with the difference between the measured minimum stimulated emission intensities.

2. A method as defined in claim 1 wherein the area of said one region within a radiation exposure field of said stimulable phosphor sheet is within the range of approximately 20% to approximately 80% of the area of the whole surface of said stimulable phosphor sheet.

3. A method as defined in claim 1 wherein said scale factor is adjusted on the basis of the minimum stimulated emission intensity Smin and the maximum stimulated emission intensity Smax, and said minimum stimulated emission intensity Smin is calculated by $$Smin = Smin\ B - F(\alpha)$$

$$\alpha = Smin\ B - Smin\ A$$

where Smin A designates said minimum stimulated emission intensity among all points over the whole surface of said stimulable phosphor sheet, and Smin B denotes said minimum stimulated emission intensity among all points in one region within a radiation exposure field of said stimulable phosphor sheet.

4. A method as defined in claim 1, 2 or 3 wherein said preliminary read-out is conducted within one hour before said final read-out is started.

5. A method as defined in claim 1, 2 or 3 wherein said preliminary read-out and said final read-out are conducted by scanning said stimulable phosphor sheet with respective stimulating rays.

6. A method as defined in claim 1, 2 or 3 wherein said stimulating rays in said preliminary read-out and said final read-out are laser beams.

* * * * *

UNITED STATES PATENT AND TRADEMARK OFFICE
CERTIFICATE OF CORRECTION

PATENT NO. : 4,620,097

DATED : October 28, 1986

INVENTOR(S) : HIROSHI TANAKA, ET AL

It is certified that error appears in the above-identified patent and that said Letters Patent is hereby corrected as shown below:

Page 1, Col. 1 insert:

-- [30] Foreign Application Priority Data

Nov. 17, 1983 [JP] Japan..................216845/83 --

Signed and Sealed this

Tenth Day of March, 1987

*Attest:*

DONALD J. QUIGG

*Attesting Officer*   *Commissioner of Patents and Trademarks*